United States Patent [19]

Hayano

[11] Patent Number: 4,894,821
[45] Date of Patent: Jan. 16, 1990

[54] TIME DIVISION SWITCHING SYSTEM WITH TIME SLOT ALIGNMENT CIRCUITRY

[75] Inventor: Shin-Ichiro Hayano, Tokyo, Japan

[73] Assignee: NEC Corporation, Japan

[21] Appl. No.: 101,759

[22] Filed: Sep. 28, 1987

[30] Foreign Application Priority Data

Sep. 30, 1986 [JP] Japan ............................. 61-233632
Jan. 7, 1987 [JP] Japan ................................ 62-2240

[51] Int. Cl.⁴ ........................................... H04Q 11/04
[52] U.S. Cl. .................................... 370/58.1; 370/63
[58] Field of Search ................ 370/58, 60, 61, 63, 370/94

[56] References Cited

U.S. PATENT DOCUMENTS

| | | | |
|---|---|---|---|
| 4,101,737 | 7/1978 | Philip | 370/63 |
| 4,300,230 | 11/1981 | Philip et al. | 370/63 |
| 4,382,294 | 5/1983 | Beuscher et al. | 370/63 |
| 4,399,534 | 8/1983 | Simmons et al. | 370/63 |
| 4,412,322 | 10/1983 | Briley et al. | 370/63 |

*Primary Examiner*—M. H. Paschall
*Attorney, Agent, or Firm*—Ostrolenk, Faber, Gerb & Soffen

[57] ABSTRACT

In a time division switching system, a reference pulse generator generates constant reference timing pulses for operating a switch. First and second variable phase pulse generators generate first and second trains of variable phase timing pulses. Data signals on a first group of input lines are multiplexed in response to the timing pulses of the first train to produce a first time division multiplexed (TDM) signal and data signals on a second group of the input lines are multiplexed in response to the timing pulses of the second train to produce a second TDM signal. The TDM signals are carried on first and second highways respectively to the space switch. The first and second variable phase pulse generators are controlled so that the timing of each of the first and second TDM signals coincides in the space switch with the reference timing pulse.

26 Claims, 9 Drawing Sheets

TIME DIVISION SWITCHING SYSTEM WITH TIME SLOT ALIGNMENT CIRCUITRY

BACKGROUND OF THE INVENTION

The present invention relates generally to time division switching systems, and more particularly to such a time division switching system capable of operating at high speed.

In a typical prior art time division switching system of time-space-time (TST) configuration, each of a plurality of inlet time switches is connected in an inlet highway between a multiplexer and a space switch and each of a plurality of outlet time switches is connected in an outlet highway between the space switch and a demultiplexer. Each of the time switches interchange time slots on each highway so that a desired pair of time slots on different inlet highways are switched to the same time slots. The space switch operates on a "time-divided basis" by having its crosspoints shared between the time slots of the inlet and outlet highways. The space switch responds to a control signal which is generated in response to a timing signal to cause switching to occur in phase with the arrival of the incoming time slots. For this reason, the timing at which the space switch operates is required to coincide with the timing at which the incoming time slots arrive at the space switch. If the operating speed of the system is very high, however, the length of inlet highways must be equal to each other. This requirement imposes severe limitations on the design of a high speed time division switching system.

SUMMARY OF THE INVENTION

It is therefore an object of the present invention to provide a time division switching system which allows freedom of system configuration for high speed switching.

According to a first aspect of the present invention, a time division switching system comprises a space switch and a reference pulse generator for generating constant timing pulses for operating the space switch. First and second variable phase pulse generators generate first and second trains of variable phase timing pulses. Data signals on a first group of input lines are multiplexed in response to the timing pulses of the first train to produce a first time division multiplexed (TDM) signal and data signals on a second group of the input lines are multiplexed in response to the timing pulses of the second train to produce a second TDM signal. The TDM signals are carried on first and second highways respectively to the space switch. The first and second variable phase pulse generators are controlled so that the timing of each of the first and second TDM signals coincides in the space switch with the reference timing pulse.

According to a second aspect of the invention, the time division switching system comprises a switch connected in a TDM highway which carries a TDM input containing a frame sync pattern and data signals on respective time slots. A reference frame pulse generator generates a reference pulse at constant frame intervals. Control data necessary for operating the switch is generated in response to the reference pulse and fed into a buffer storage. A frame synchronizer is connected to the highway for detecting the frame sync pattern in the TDM input to generate a timing pulse. Data is read out of the buffer storage into the switch in response to the timing pulse to cause switching to occur.

According to a third aspect of the invention, the time division switching system comprises a switch connected in a TDM highway on which a TDM input containing a frame sync pattern and data signals is carried. A variable phase frame pulse generator is provided for generating a frame pulse at variable frame intervals. Control data for operating the switch and a frame sync pattern are generated and supplied to control line to the switch to cause switching to occur. A first frame synchronizer is connected to the highway for detecting the frame sync pattern in the TDM input and generating a first timing pulse. A second frame synchronizer is connected to the control line for detecting a frame sync pattern to generate a second timing pulse. A phase comparator is provided for detecting a phase mismatch between the first and second timing pulses and controlling the variable phase pulse generator so that the data signals arrive at the switch in phase with the arrival of the frame sync pattern through the control line.

BRIEF DESCRIPTION OF THE DRAWINGS

The present invention will be described in further detail with reference to the accompanying drawings, in which.

DETAILED DESCRIPTION

Figure 1:
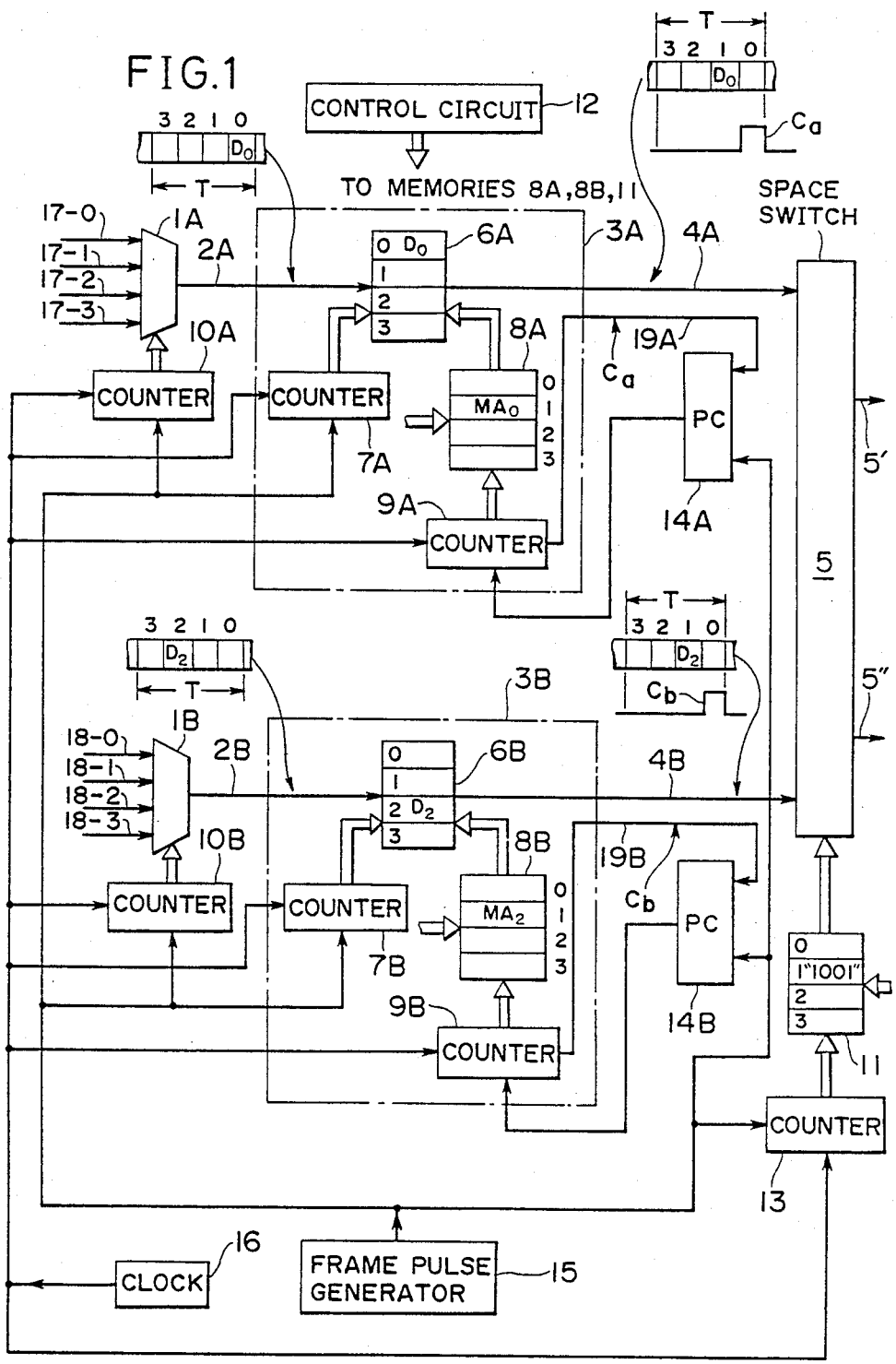
FIG. 1 is a block diagram of a first embodiment of the present invention.

Referring now to FIG. 1, there is shown a time division switching system according to a first embodiment of the present invention. Digital inputs are supplied to multiplexers 1A and 1B where they are multiplexed into time slots on inlet highways 2A and 2B, respectively. Time division multiplexed (TDM) outputs on inlet highways 2A and 2B are supplied to time switches 3A and 3B, respectively. The data outputs of time switches 3A and 3B are coupled through outlet highways 4A and 4B, respectively to a space switch 5. Time switch 3A comprises a data memory 6A driven by an address counter 7A and a control memory 8A driven by an address counter 9A. Corresponding parts are used in time switch 3B and are referenced with corresponding numeral. Input lines 17-0 through 17-3 of multiplexer 1A are accessed by an address counter 10A so that respective data signals on input lines 17-0 to 17-3 are multiplexed respectively into time slots #0 through #3 of inlet highway 2A. Likewise, input lines 18-0 through 18-3 of multiplexer 1B are accessed by an address counter 10B so that respective data signals on input lines 18-0 to 18-3 are multiplexed respectively into time slot #0 through #3 on the inlet highway 2B.

A path selection memory 11 is connected to the space switch 5. A control circuit 12 (see top of FIG. 1) is associated with the path selection memory 11 to write path selection address data. An address counter 13 drives the path selection memory 11 to supply address information to space switch 5 to establish a path between highways 4A, 4B and output highways 5' and 5".

Address counter 9A is a self-resettable counter which resets itself when it has counted a predetermined number of slot timing pulses supplied from a clock source 16. When counter 9A resets, it produces a carry output Ca which is coupled by way of line 19A, which runs parallel to highway 4A, to the first input of a phase comparator CPC 14A which is located adjacent the space switch 5. The second input of phase comparator 14A is connected to the output of a frame pulse generator 15. Phase comparator 14A generates a logical-one output when time slots of the two inputs do not occur in phase with each other and switches its output state to logical-zero when they coincide with each other. The output of phase comparator 14A is connected to a clock inhibit terminal of the counter 9A to prevent it from counting slot timing pulses from clock source 16 when the output is at logical-one level. Address counter 9B, similarly, is a self-resettable counter whose carry output Cb is connected to the first input of a phase comparator 14B by way of line 19B which runs parallel to highway 4B. Phase comparator 14B supplies a logical-one output to the clock inhibit terminal of counter 9B when it detects a mismatch between the carry pulse Cb and the reference frame pulse.

The reference frame pulse is also supplied to the reset terminals of address counters 7A, 7B, 10A, 10B and 13 to cause them to initiate counting slot timing pulses from clock source 16. Address counters 10A and 10B sequentially couple their data inputs to the inlet highways 2A and 2B, respectively, in response to the slot timing pulse.

In the time switch 3A, address counter 7A has its output coupled to the write address input of the data memory 6A to sequentially access its memory cells #0 through #3 in response to the slot timing pulse to write the multiplexed data signals into the data memory 6A. Control memory 8A has memory cells #0 to #3 for storing address data representing the memory addresses of the cells of data memory 6A which are supplied from the control circuit 12. The memory address data is read out of each control memory 8A to the read address input of data memory 6A in response to an address count supplied from the associated address counter 9A. The foregoing description of the time switch 8A also pertains to time switch 3B, since these switches have corresponding parts.

The operation of the switching system of FIG. 1 is as follows. If data signals $D_0$ and $D_2$ on inlet highways 2A and 2B, respectively, are to be switched to the #1 time slot of output highways 4A and 4B, control circuit 12 writes the memory address $MA_0$ of #0 cell of data memory 6A into the #1 cell of control memory 8A and the memory address $MA_2$ of #2 cell of data memory 6B into the #1 cell of control memory 8B and further writes into the #1 cell of path selection memory 11.

Address counters 7A, 7B, 10A, 10B and 13 are driven by slot timing pulses from clock source 16 and are reset at frame intervals T by the reference frame pulse generator 15. Input lines 17-0 to 17-3 are sequentially multiplexed into #0 to #3 time slots of inlet highway 2A by multiplexer 1A in response to sequential address data supplied from counter 10A, and input lines 18-0 to 18-3 are sequentially multiplexed into #0 to #3 time slots of inlet highway 2B by multiplexer 1B in response to sequential address data supplied from counter 10B. Data signal $D_0$ on input line 17-0 is multiplexed into the #0 time slot of inlet highway 2A and written into the #0 cell of data memory 6A in response to sequential address data from counter 7A and read out of memory 6A in response to the memory address $MA_0$ supplied from the control memory 8A. Likewise, data signal $D_2$ on inlet highway 2B is written into the #2 cell of data memory 6B in response to sequential address data from counter 7B and read out of memory 6B in response to the memory address $MA_2$ from control memory 8B. Thus, data signals $D_0$ and $D_2$ are both multiplexed into the #1 time slots of outlet highways 4A and 4B, respectively.

The carry pulse Ca is produced in synchronism with the #0 time slot of outlet highway 4A and propagates through line 19A to phase comparator 14A. If this carry pulse Ca leads the reference frame pulse by two time slots, phase comparator 14A detects a phase mismatch and generates a logical-one output to inhibit the address counter 9A from counting a slot timing pulse so that the reference frame pulse now leads the next carry pulse Ca by one time slot. The process is repeated to make both pulses coincide. In like manner, the time slot difference between the frame pulse and carry pulse Cb of address counter 9B is reduced to zero by the phase comparator 14B if the carry pulse Cb leads the reference frame pulse. As a result, the #1 time slots on both outlet highways 4A and 4B are rendered time coincident with the timing at which the address data "1001" is read out of the #1 cell of path control memory 11 into the space switch 5. Therefore, the slot timing of both outlet highways 4A and 4B becomes precisely in phase with the slot timing of space switch 5.

Figure 2:
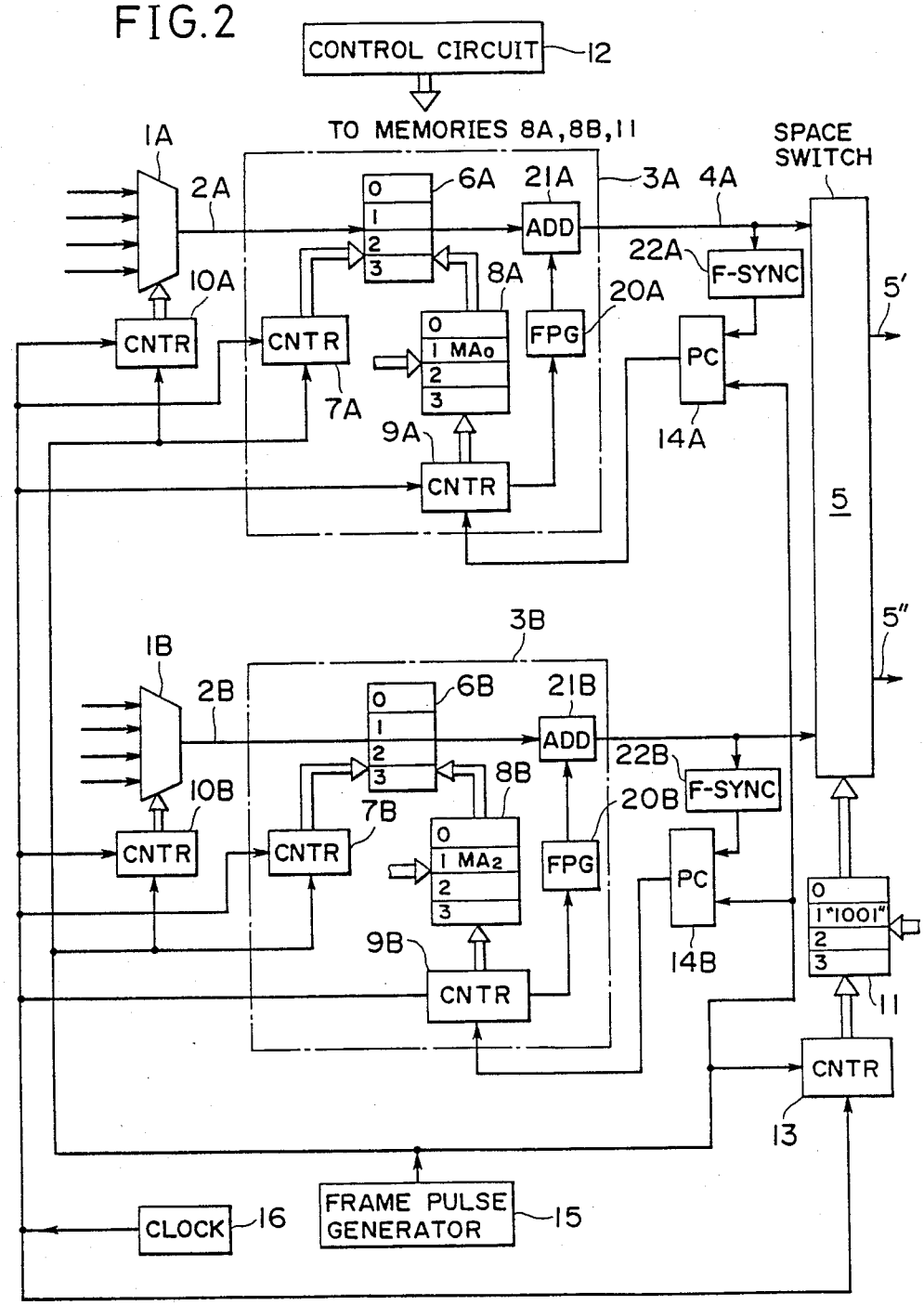
FIG. 2 is a block diagram of a modification of the first embodiment.

A second embodiment of the present invention is illustrated in FIG. 2 in which like numerals are used to indicate parts corresponding to those in FIG. 1. The second embodiment differs from the first embodiment by the inclusion of frame pattern generators (FPGs) 20A, 20B, adders 21A, 21B and frame synchronizers 22A, 22B to eliminate lines 19A and 19B. Frame pattern generator 20A is connected to the carry output of address counter 9A to generate a frame sync pattern F in response to the carry pulse Ca. Adder 21A is connected in the outlet highway 4A to insert the frame sync pattern into the #0 time slot of highway 4A. Frame synchronizer 22A is connected between the highway 4A and the first input of phase comparator 14A to detect the inserted frame sync pattern F and supply a pulse to phase comparator 14A in response to the detection of a frame pattern. Phase comparator 14A generates an output in the same manner as described above to control the address counter 9A. Similarly, frame pattern generator 20B is provided to generate a frame sync pattern F in response to a carry pulse Cb from counter 9B. Adder 21B is connected in the outlet highway 4B to insert the frame sync pattern into the #0 time slot of highway 4B. Frame synchronizer 22B is connected between the highway 4B and the first input of phase comparator 14B to detect the inserted frame sync pattern F and supplied a pulse to phase comparator 14B in response to the detection of a frame pattern to cause the phase comparator 14B output to the counter 9B in the same manner as described above.

Figure 3:
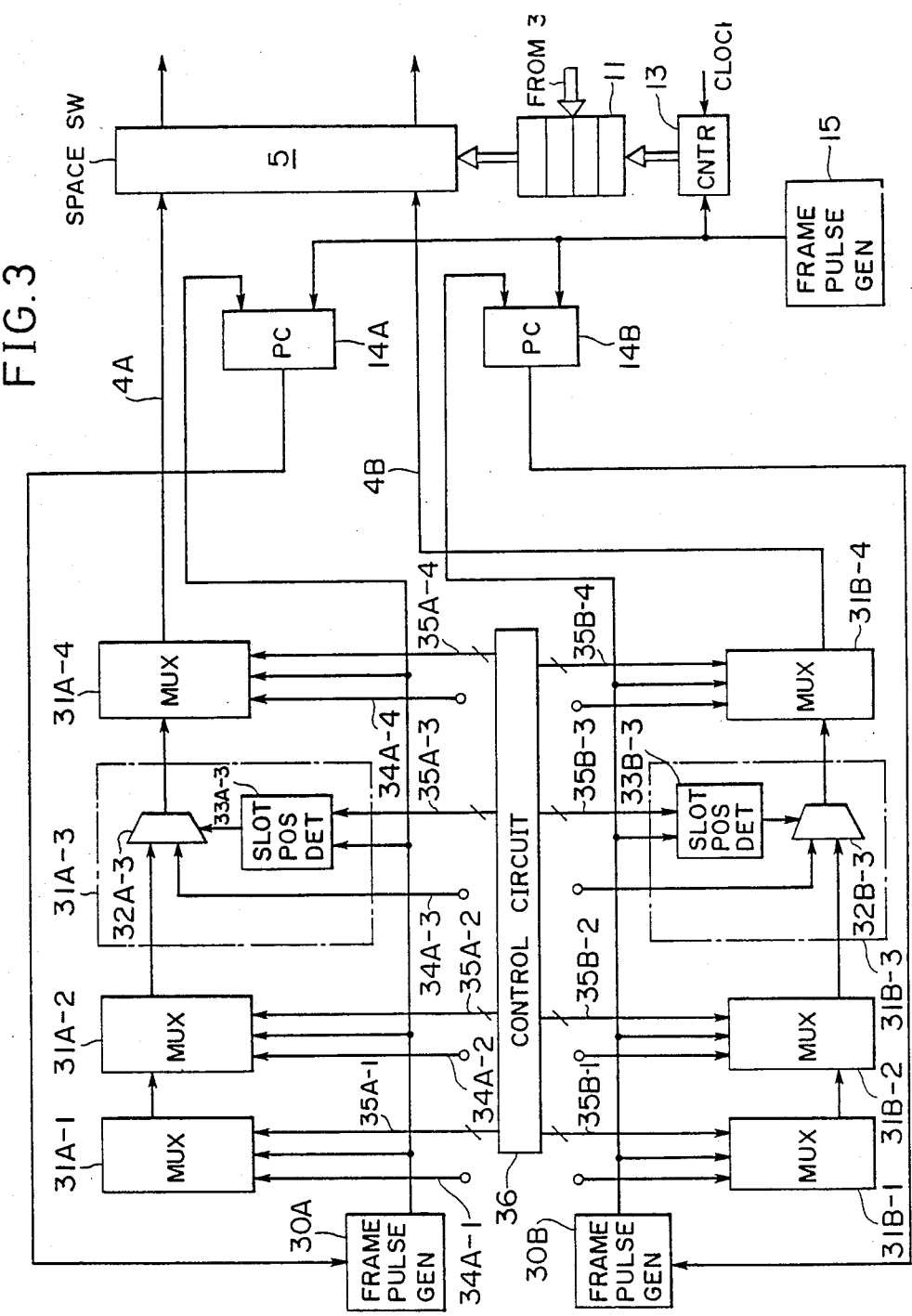
FIG. 3 is a block diagram of a further modification of the first embodiment.

The time difference compensation of the present invention can also be applied to a switching network of the type shown in FIG. 3. In this embodiment of figures, the multiplexers 1A, 1B and time switches 3A, 3B of the previous embodiment are replaced with a plurality of cascaded multiplexers 31A-1 through 31A-4, a plurality of cascaded multiplexers 31B-1 through 31B-4, and variable phase frame pulse generators 30A and 30B.

Each multiplexer 31X-K (where X is either A or B and k ranges from 1 to 4) is supplied with a phase-controlled frame pulse from the frame pulse generator 30, and includes a gate circuit 32X-K and a slot position detector 33X-k, shown for exemplary multiplexers 31A-3 and 31B-3. Each gate circuit 32X-K has a first data input connected to the output of the preceding multiplexer and a second data input for receiving a digital signal from an input line 34X-K. As will be described below, in the absence of an output from the associated slot position detector 33X-K, the output of the preceding multiplexer is passed through each gate circuit 32X-K to the next and in response to a timing signal from the slot position detector, gate circuit 32X-K is switched to pass the signal on input line 34X-K to the next. Each slot position detector 33X-K receives the output of frame pulse generator 30 to determine the position of a time slot in accordance with a switching control word supplied from a control unit 36 through a control bus 35X-K and switches the gate circuit 32X-K to multiplex the input digital signal on line 34X-K into the determined time slot. If it is desired to select #1 time slot for a data signal $D_1$ on input line 34A-1 and select #1 time slot for a data signal $D_3$ on input line 34B-3, a control word "001" is supplied to both slot position detectors 33A-1 and 33B-3 from the control circuit 36.

The output of variable phase frame pulse generator 30A is also applied to phase comparator 14A for comparison with the reference frame pulse from frame pulse generator 15 to generate a logical-one output if the output of variable phase frame pulse generator 30A leads the reference pulse. The output of phase comparator 14A is applied to the phase control input of variable phase pulse generator 30A to cause it to delay until it coincides with the reference frame timing. Likewise, the output of variable phase frame pulse generator 30B is applied to phase comparator 14B for comparison with the reference pulse. A logical-one output is supplied to pulse generator 30B if it leads the reference frame timing. Thus, time slots on highway 4A are made to coincide with time slots on highway 4B and hence with the slot timing of space switch 5.

Figure 4:
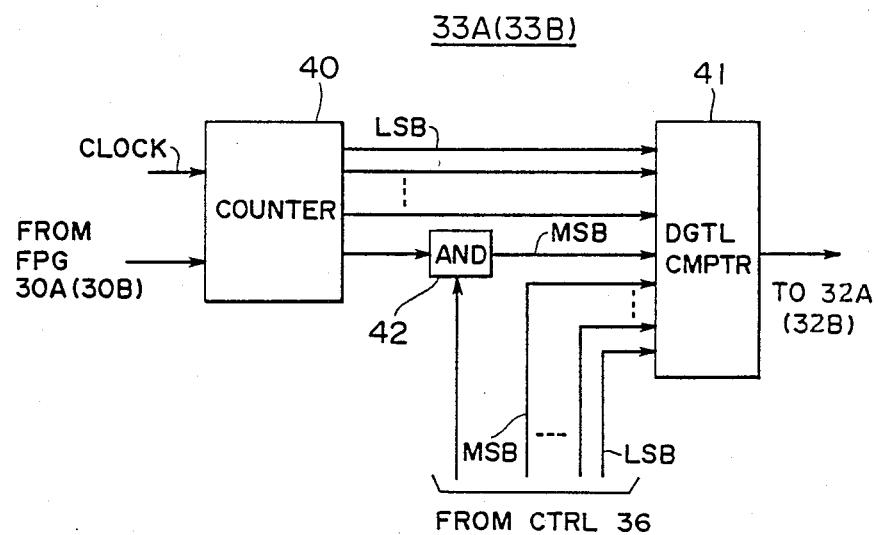
FIG. 4 is a circuit diagram of each of the slot position detectors of FIG. 3.

As shown in FIG. 4, each slot position detector 33A, 33B comprises an n-bit counter 40 and a digital comparator 41. Counter 40 has a clock input for incrementing a count in response to slot timing pulses supplied from a clock (not shown). The reset input of counter 40 is supplied from the associated variable phase pulse generator 30A or 30B. The binary incremental count value is thus representative of the position of a time slot with respect to the frame pulse which occurs in phase with #0 time slot. The outputs of counter 40 are supplied to digital comparator 41 which compares them with an n-bit control word from the control circuit 36 to detect a match. The control word represents the time slot position into which it is desired to multiplex an input data signal. When the comparator 41 detects a coincidence, it supplies a timing pulse to the associated gate circuit 32A or 32B exactly in phase with the slot into which the data signal is desired to be multiplexed. An AND gate 42 is preferably connected to the most significant bit output of counter 40 to invert its ONE state to ZERO in response to a ZERO input from the control circuit 36 if it is desired to cause digital comparator 41 to produce its output at twice the normal rate obtained in response to a ONE input from control circuit 36. By switching the binary state of the input to AND gate 42 from control circuit 36, it is possible to selectively determine the operating speed of system.

Figure 5:
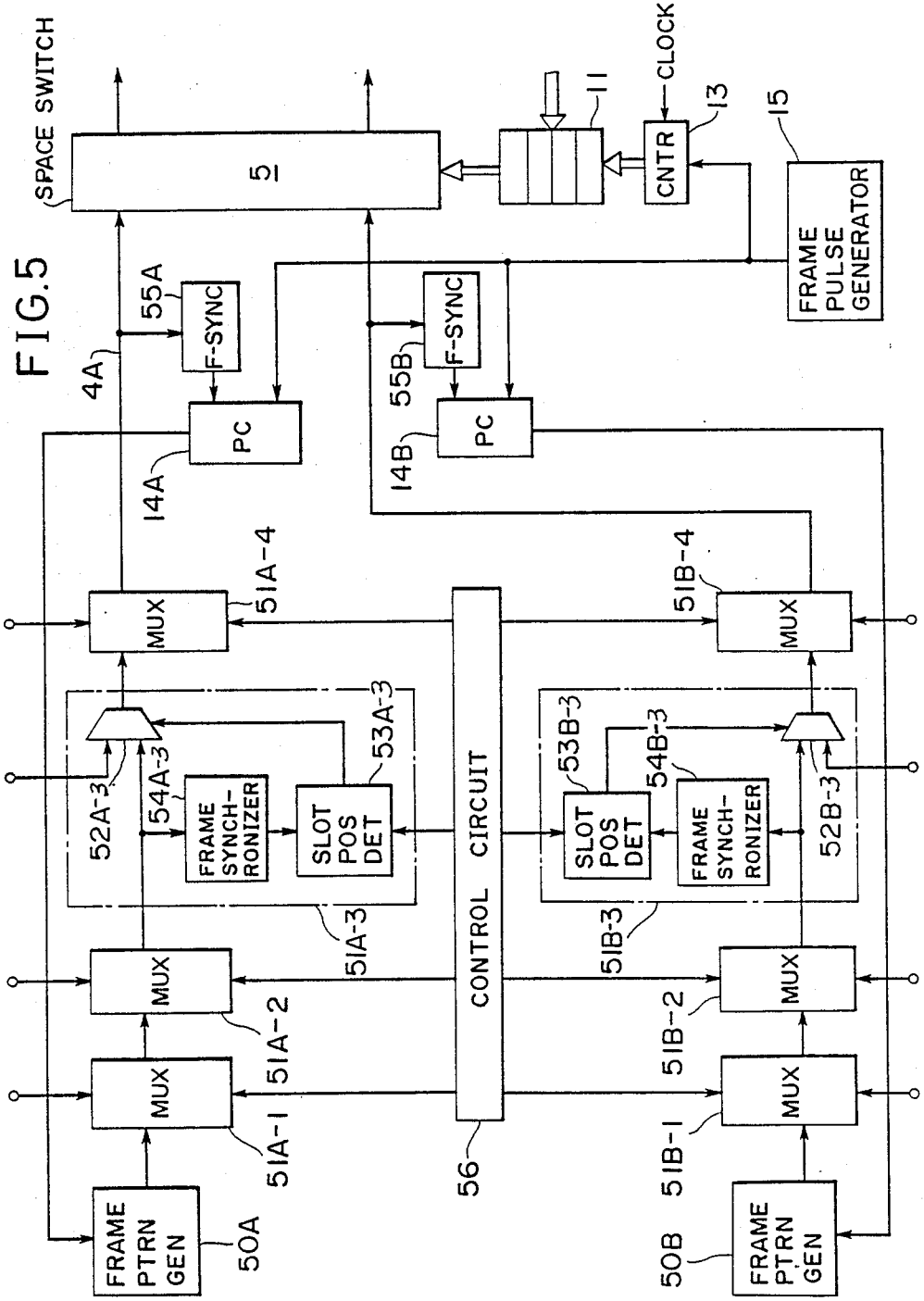
FIG. 5 is a block diagram of a modification of the embodiment of FIG. 3.

The embodiment of FIG. 3 can be modified as shown in FIG. 5. In this modification, the variable phase frame pulse generators 30A and 30B of the FIG. 3 embodiment are replaced with variable phase frame pattern generators 50A and 50B. A frame synchronizer 54X-K is included in each multiplexer 51X-K (where X is either A or B and k ranges from 1 to 4). In addition, a frame synchronizer 55A (55B) is connected between highway 4A (4B) and the first input of phase comparator 14A (14B). It is understood that frame pattern generator 50A supplies a frame sync pattern F to one input of the gate circuit 52A-1 of multiplexer 51A-1. In the absence of a timing pulse from the slot position detector 53A-1, the gate circuit 52A-1 passes the frame pattern to the gate circuit 52A-2 so that it is multiplxed into the #0 time slot of a TDM signal. Frame synchronizer 54A-k of each multiplexer 51A-k is connected to the output of the preceding multiplexer to detect the frame sync pattern in the #0 time slot and supplies a frame timing pulse to the slot position detector 53A-k. As in the FIG. 3 embodiment, the input data signal is multiplexed into a time slot of the TDM signal in accordance with the control word supplied from the control circuit 56. Fame sync pattern on highway 4A is then detected by the frame synchronizer 55A and supplies a timing pulse to the phase comparator 14A for comparison with the frame reference pulse. If it leads the reference timing, phase comparator 14A causes a delay time to be introduced to variable phase frame pattern generator 50A until it coincides with the reference timing.

Similar operations occur in the multiplexers 51B-k, so that the time slots on both highways 4A and 4B are time coincident with the path selection timing of the space switch 5.

Figure 6:
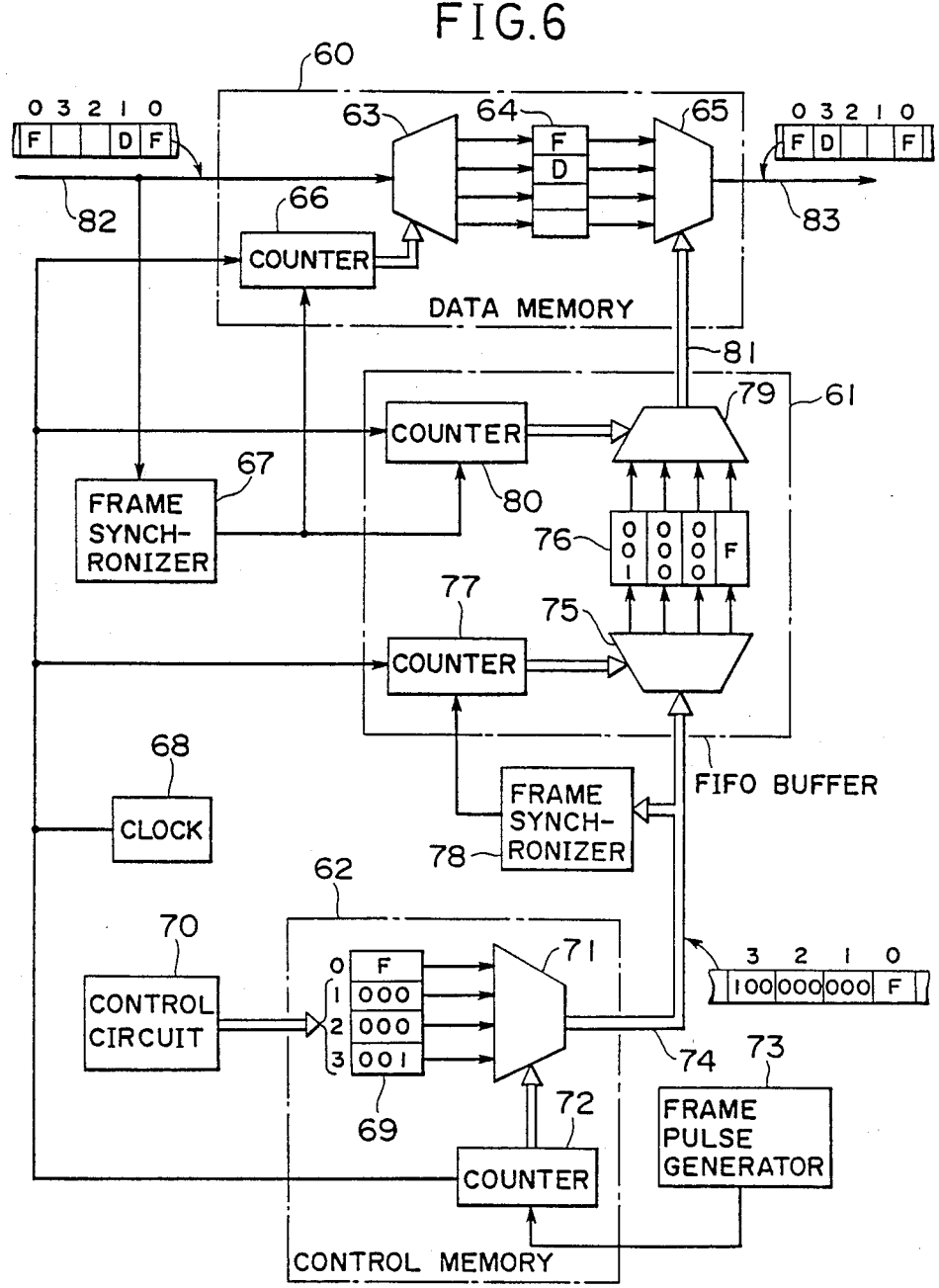
FIG. 6 is a block diagram of a second embodiment of the present invention.

Second and third embodiments of the present invention are shown in FIGS. 6 to 9. In FIG. 6, the second embodiment comparises a data memory 60, a first-in-first-out buffer 61 located adjacent the data memory 60 and a control memory 62 which may be located remote from the data memory 61. Data memory 60 includes a demultiplexer 63, an array of memory cells 64 and a multiplexer 65. Demultiplexer 63 receives a TDM input on an inlet highway 82 and demultiplexes such input sequentially into the cells 64 in accordance with a binary address count supplied from a counter 66. A frame synchronizer 67 is connected to inlet highway 82 to detect a sync pattern multiplexed in the TDM input. Counter 66 is reset by frame synchronizer 67 in response to the detection of a sync pattern in the TDM input to start counting slot timing pulses supplied from a clock source 68. Multiplexer 65 reads data signals out of the cells 64 onto an outlet highway 83 in the order specified by an address count supplied from the FIFO buffer 61 so that the time slots of data signals are interchanged between TDM input on highway 82 and TDM output on highway 83 and each frame always beings with a frame pattern F.

Control memory 62 includes an array of memory cells 69. The #0 cells 69 stores the frame sync pattern F and the #1 through #3 cells store memory addresses of the data memory cells 64 supplied from a control circuit 70. The contents of the memory cells 69 are sequentially retrieved and multiplexed into a bit stream by a multiplexer 71 driven by an address count supplied from a read counter 72 which is reset by a reference frame pulse generator 73. The output of multiplexer 71 is supplied on a control bus 74 to the input of a demultiplexer 75. The frame pattern F and control data on bus 74 are demultiplexed and stored into memory cells 76 sequentially in response to an address count supplied from a counter 77. A frame synchronizer 78 located adjacent the data memory 61 is connected to data bus 74 to detect a frame sync pattern F to reset the address count at frame intervals. A multiplexer 79 is responsive to an address count supplied from a counter 80 to sequentially read the stored frame pattern F and address data from the cells 76 onto an address bus 81 which is connected to the multiplexer 65. The frame pattern F read out of memory cells 76 is used to access the frame pattern F which is stored in the memory cells 64 to multiplex it into the #0 time slot of TDM output and the control data are used to read data signals and multiplex them into the #1 to #3 time slots of the TDM output. A frame synchronizer 67 is connected to the inlet highway 82 to detect a frame sync pattern multiplexed into the inlet highway 82 to generate a frame timing pulse. Counter 80 increments its address count in response to the slot timing pulse from clock source 68 and is reset by frame synchronizer 67.

If the frame timing on the TDM input lags behind the frame timing of the reference pulse generator 73, the address data of a given frame is stored into memory cells 76 of the buffer 61 prior to the arrival of a TDM input of that given frame to the data memory 60. The time difference between these frame timings can be absorbed by the FIFO buffer 61.

Figure 7:
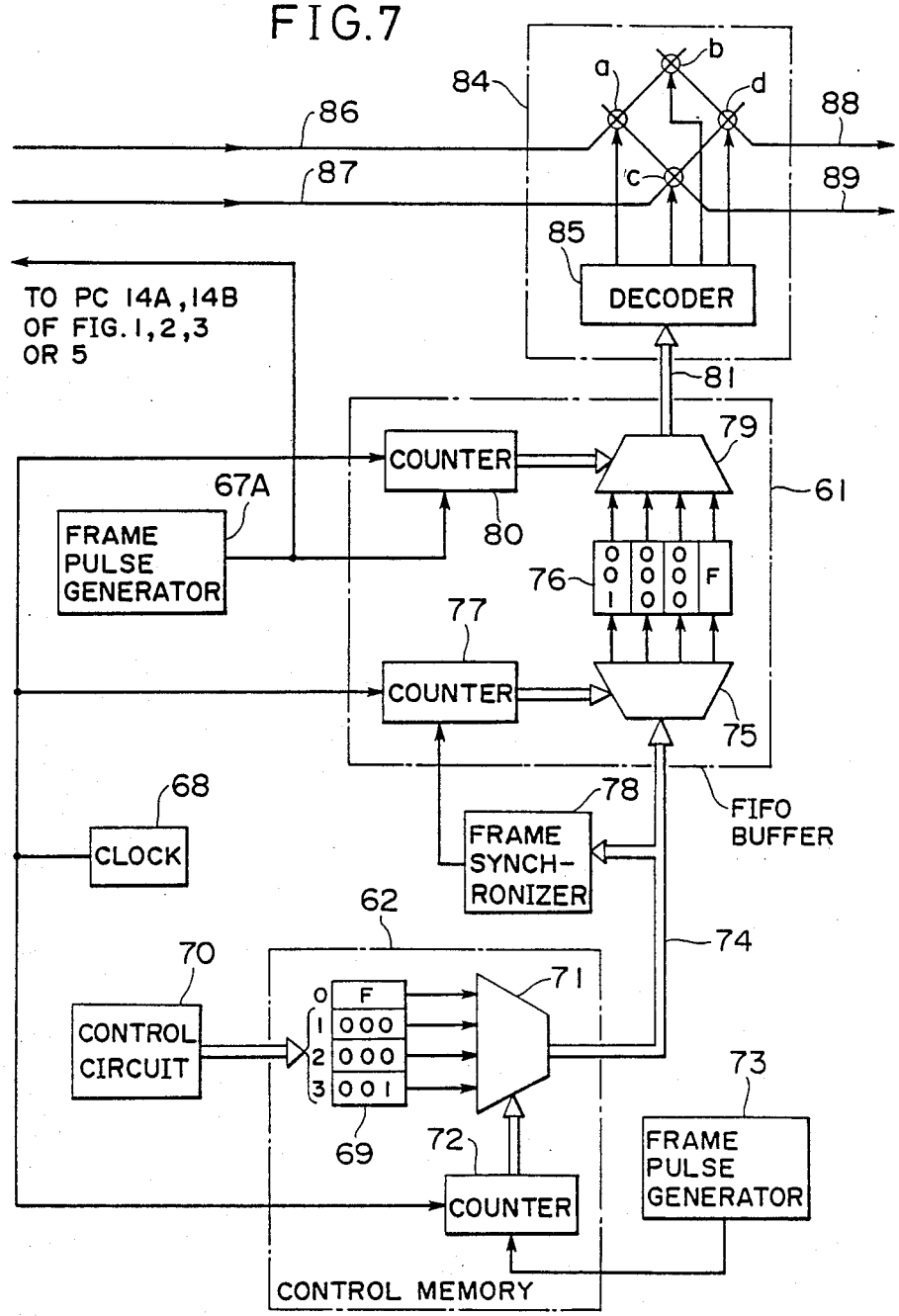
FIG. 7 is a block diagram of a modification of the third embodiment.

In FIG. 7, in which like numerals are used to indicate parts corresponding to those in FIG. 6, the data memory 60 of FIG. 6 is replaced with a space switch 84. Space switch 84 is made up of crosspoints a, b, c and d and a decoder 85 responsive to the output of FIFO buffer 61 to selectively operate the crosspoints to establish a switched connection between inlet highways 86, 87 and outlet highways 88, 89. Control circuit 70 supplies a switching signal to the cells 69 identifying one of the crosspoints a, b, c, d. In order that the TDM outputs on highways 88 and 89 contain a frame sync pattern F in appropriate time slots, decode 85 interprets the frame pattern contained in the control input on bus 81 as identifying the same crosspoint as one which is to be operated for interchanging time slots. For example, if data signal on #1 time slot on inlet highway 87 is to be switched to outlet highway 89, a three-bit word, "001", for example, is stored into the #3 of cells 69 and decoder 85 treats the frame pattern F on bus 81 as it treats the address "001", whereby crosspoint c is operated and the data signal on #1 time slot is switched to highway 89 and the frame pattern in #0 time slot is likewise switched to the same highway 89.

Counter 80 is reset in response to a frame timing pulse supplied from a frame pulse generator 67A. To establish synchronism between the frame pulse generator 67A and the frame timing on the inlet highways 86, 87, the output of frame pulse counter 67A is supplied as a reference frame timing pulse to the second inputs of the phase comparators 14A and 14B of the embodiment of FIGS. 1, 2, 3 or 5.

As in the FIG. 6 embodiment, the time lag of TDM inputs on highways 86, 87 is absorbed by the buffer 61. Thus, the timing at which the output of multiplexer 79 is supplied to the decoder 85 exactly coincides with the timing at which the desired data signal on TDM inputs enters the space switch 84.

Figure 8:
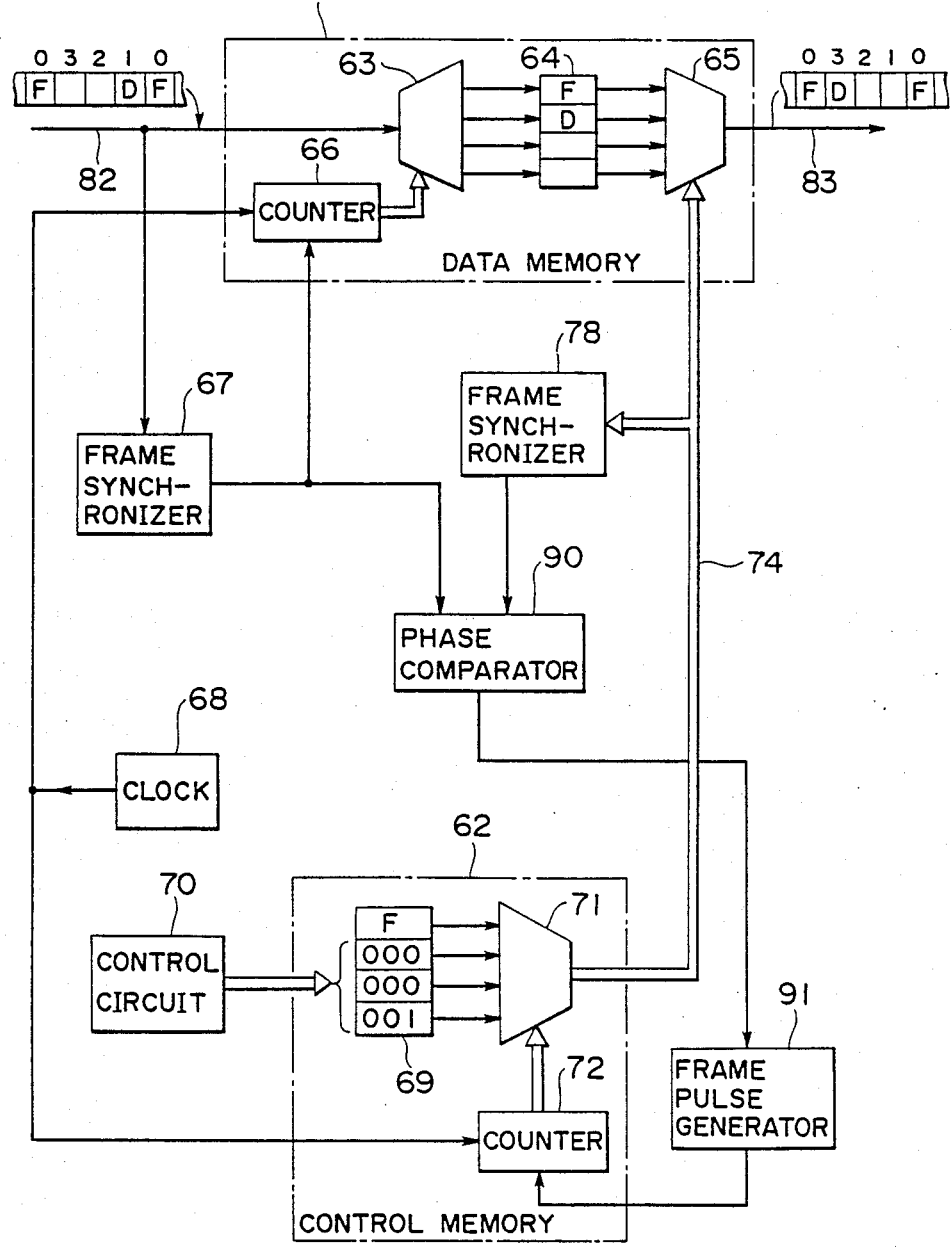
FIG. 8 is a block diagram of a third embodiment of the present invention.

A third embodiment of the invention is shown in FIG. 8 which differs from the FIG. 6 embodiment in that the FIFO buffer memory 61 of FIG. 6 is replaced with a phase comparator 90; the output of multiplexer 71 is directly applied to the multiplexer 65 and the frame pulse generator 73 is replaced with a variable phase frame pulse generator 91. Comparator 90 compares the outputs of frame synchronizers 67 and 78 with each other to detect a phase mismatch. If the frame timing of the TDM input lags behind the reference frame timing provided by the frame pulse generator 91, phase comparator 90 supplies a phase control signal to the variable phase pulse generator 91 to introduce a delay time to the reference frame timing, so that the address timing supplied to the multiplexer 65 is exactly in phase with the arrival of the TDM input at the data memory 60.

Figure 9:
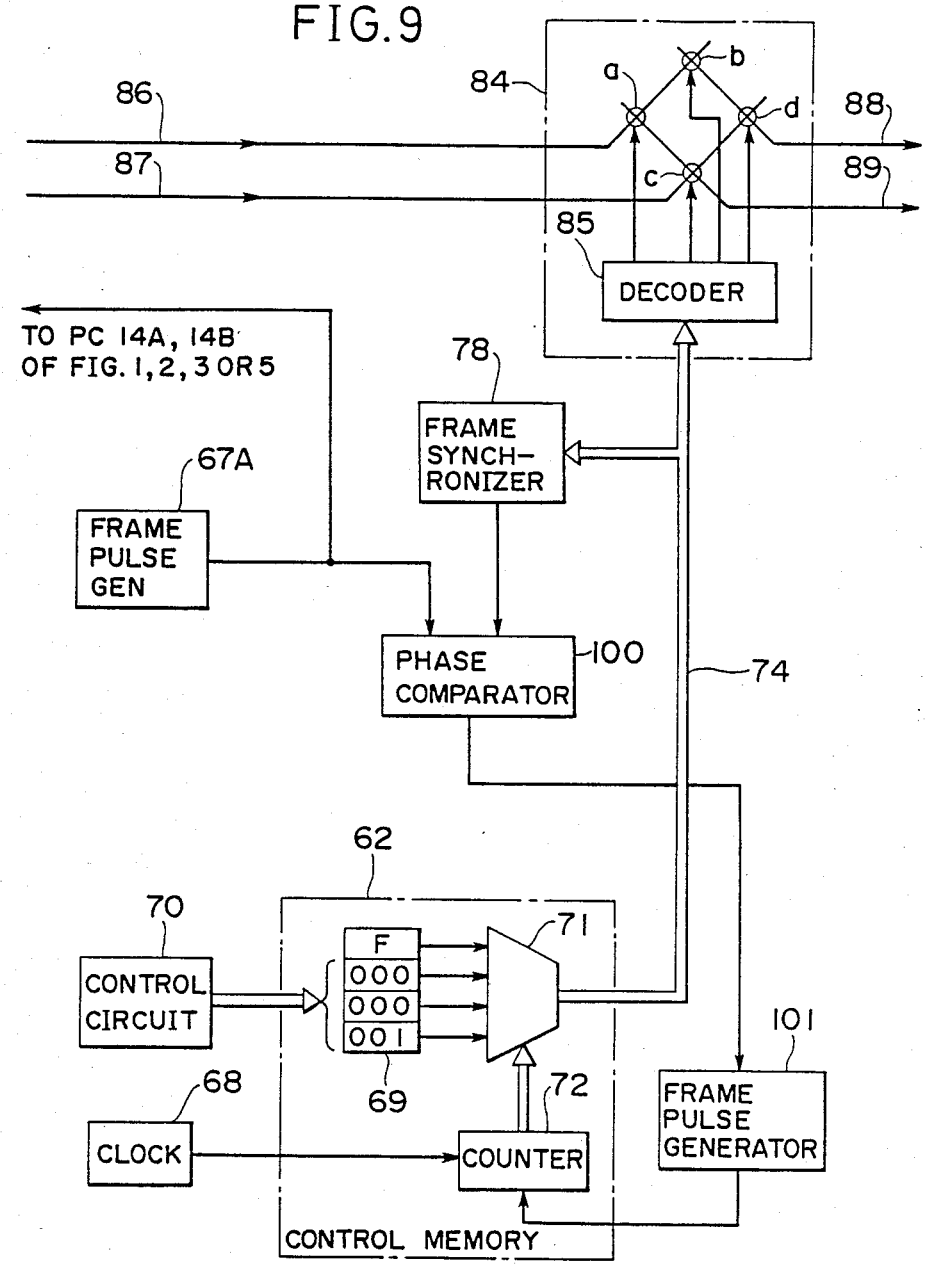
FIG. 9 is a block diagram of a modification of the third embodiment.

In like manner the embodiment of FIG. 7 is modified as shown in FIG. 9. In this modification, the FIFO buffer memory 61 of FIG. 7 is replaced with a phase comparator 100 and the output of multiplexer 71 is directly applied to the decoder 85 and the frame pulse generator 73 is replaced with a variable phase frame pulse generator 101. Comparator 100 compares the outputs of frame pulse generator 67A and frame synchronizer 78 with each other to detect a phase mismatch. If the frame timing of the TDM inputs lags behind the reference frame timing provided by the frame pulse generator 101, phase comparator 100 supplies a control signal to the variable phase pulse generator 91 to introduce a delay time to the reference frame timing, so that the address timing supplied to the decoder 85 is exactly in phase with the arrival of the TDM input at the space switch 84.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A time division switching system comprising:
  a space switch;
  a reference pulse generator for generating reference timing pulses at constant intervals;
  means for controlling said space switch in response to said reference timing pulses;
  a plurality of input lines;
  first and second variable phase pulse generators for generating first and second trains of variable phase timing pulses;
  processing means for processing data signals on a first group of said input lines in response to the timing pulses of said first train to produce a first time division multiplexed (TDM) signal and processing data signals on a second group of said input lines in response to the timing pulses of said second train to produce a second TDM signal;

first and second highways for carrying said first and second TDM signals respectively to said space switch; and timing control means for detecting time differences between said first and second variable phase timing pulses from said pulse generators and said reference timing pulses and respectively controlling said first and second variable phase pulse generators in accordance with the detected differences so that the timing of each of said first and second TDM signals coincides with each other in said space switch.

2. A time division switching system as claimed in claim 1, wherein said processing means comprises:

a first multiplexer connected to said first group of said input lines for multiplexing data signals on said first group into a first TDM input in response to said reference timing pulses;

a second multiplexer connected to said second group of said input lines for multiplexing data signals on said second group into a second TDM input in response to said reference timing pulses;

a first time switch for interchanging time slots of said first TDM input from said first multiplexer in response to the timing pulses of said first train to supply a first TDM output on said first highway to said space switch; and a second time switch for interchanging time slots of said second TDM input from said second multiplexer in response to the timing pulses of said second train to supply a second TDM output on said second highway to said space switch.

3. A time division switching system as claimed in claim 2, further comprising:

a first pattern generator for generating a first frame sync pattern in response to each timing pulse of said first train and means for combining said first frame sync pattern with data signals of said first TDM output;

a second pattern generator for generating a second frame sync pattern in response to each timing pulse of said second train and means for combining said second frame sync pattern with data signals of said second TDM output;

a first frame synchronizer connected to said first highway in a position adjacent said space switch for detecting said combined first frame sync pattern and generating a timing pulse representative of the timing of said first train; and a second frame synchronizer connected to said second highway in a position adjacent said space switch for detecting said combined second frame sync pattern and generating a timing pulse representative of the timing of said second train.

4. A time division switching system as claimed in claim 1, wherein said processing means comprises:

a first plurality of multiplexers cascaded in said first highway for multiplexing data signals on said first group of said input lines to produce said first TDM signal in response to the timing pulses of said first train; and a second plurality of multiplexers cascaded in said second highway for multiplexing data signals on said second group of said input lines to produce said second TDM signals in response to the timing pulses of said second train.

5. A time division switching system as claimed in claim 4, wherein said first and second variable phase pulse generators further generate first and second variable phase frame sync patterns respectively, and wherein said first plurality of multiplexers multiplex said first frame sync pattern with data signals of said first group of said input lines and said second plurality of multiplexers multiplex said second frame sync pattern with data signals of said second group of said input lines, the system further comprising:

a first frame synchronizer connected to said first highway in a position adjacent said space switch for detecting said first frame sync pattern in said first TDM signal and generating a timing pulse representative of the timing of said first train; and a second frame synchronizer connected to said second highway in a position adjacent said space switch for detecting said second frame sync pattern in said second TDM signal and generating a timing pulse representative of the timing of said second train.

6. A time division switching system comprising:

switching means connected between an inlet time division multiplexed (TDM) highway and an outlet TDM highway, said inlet TDM highway carrying a TDM input containing a frame sync pattern and data signals;

a reference frame pulse generator for generating a reference pulse at constant frame intervals;

control means for generating switching control data in response to said reference pulse;

buffer storage means for storing said switching control data;

frame synchronizer means for generating a timing pulse in response to said frame sync pattern in said TDM input; and means for reading said switching control data out of said buffer storage means into said switch means in response to said timing pulse from said frame synchronizer means to cause the switch means to effect the switching control data and said TDM input to said outlet TDM highway so that said switching control data and and said TDM input are time coincident with each other in said switch means.

7. A time division switching system as claimed in claim 6, wherein said switch means comprises a time switch.

8. A time division switching system as claimed in claim 6, wherein said switch means comprises a space switch.

9. A time division switching system as claimed in claim 6, wherein said control means includes means for generating a second frame sync pattern and combining it with said switching control data, the system further comprising:

a second frame synchronizer for detecting said second frame pattern to generate a second timing pulse; and means for writing said switching control data into said buffer storage means in response to said second timing pulse.

10. A time division switching system comprising:

switch means connected between an inlet time division multiplexed )TDM) highway and an outlet TDM highway, said inlet TDM highway carrying a TDM input containing a frame synch pattern and data signals;

a variable phase frame pulse generator for generating a variable phase frame pulse;

control means for generating switching control data and a frame sync pattern in response to said variable phase frame pulse and supplying said switching control data and frame sync pattern to said switch means to cause it to effect the switching of said TDM input to said outlet TDM highway;
a first frame synchronizer for generating a first timing pulse synchronized with the frame sync pattern contained in said TDM input;
a second frame synchronizer for detecting the frame sync pattern from said control means and generating a second timing pulse; and
a phase comparator for detecting a time difference between said first and second timing pulses and controlling said variable phase pulse generator so that said data signals arrive at said switch means in phase with the arrival of said switching control data from said control means to said switch means.

11. A time division switching system as claimed in claim 10, wherein said switch means comprises a time switch.

12. A time division switching system as claimed in claim 10, wherein said switch means comprises a space switch.

13. A time division switching system comprising:
a clock source for generating slot timing pulses;
a path selection address memory for storing a path selection address and a path selection counter for sequentially reading the address out of said path selection address memory in response to said slot timing pulses;
a space switch for establishing a switched connection in accordance with the address read out of said path selection address memory;
a time switch having a data memory for storing data signals of a time division multiplexed (TDM) input and a control memory for storing a memory address of said data memory;
first and second time switch counters for respectively driving the data and control memories of said time switch in response to said slot timing pulses for causing data signals of said TDM input to be sequentially stored into the data memory and causing the stored data signals to be read therefrom to said space switch in accordance with the memory address stored in the control memory, said second time switch counter being self-resettable at frame intervals;
a reference pulse generator for generating a reference frame timing pulse for resetting said space switch counter and said first time switch counter at frame intervals; and
a phase comparator for detecting a a time difference between said reference frame timing pulse and the reset timing of said second time switch counter and controlling the timing of said second time switch counter according to said detected time difference so that data signals from said time switch arrive at said space switch in phase with the read timing of said path selection memory.

14. A time division switching system as claimed in claim 13, further comprising:
a second time switch having a data memory for storing data signals of a second TDM input and a control memory for storing a memory address of the last-mentioned data memory;
third and fourth time switch counters for respectively driving the data and control memories of said second time switch in response to said slot timing pulses and causing data signals of said second TDM input to be sequentially stored into the last-mentioned data memory and causing the stored data signals to be read therefrom to said space switch in accordance with the memory address stored in the last-mentioned control memory, said fourth time switch counter being self-resettable at frame intervals; and
a second phase comparator for detecting a a second time difference between said reference frame timing pulse and the reset timing of said second time switch counter and controlling the timing of said fourth time switch counter according to said detected time difference so that data signals from said second time switch arrive at said space switch in phase with the read timing of said path selection memory.

15. A time division switching system as claimed in claim 13, further comprising:
means for generating a frame sync pattern when said second time switch counter is reset and combining it with the data signal read out of said data memory of said first time switch; and
means for detecting said combined frame sync pattern at a point adjacent said space switch and generating a timing pulse as an indication of the timing of said second time switch counter in response to the detection of the frame sync pattern.

16. A time division switching system as claimed in claim 14, further comprising:
means for generating a frame sync pattern when said fourth time switch counter is reset and combining it with the data signal read out of said data memory of said second time switch; and
means for detecting said combined frame sync pattern at a point adjacent said space switch and generating a timing pulse as an indication of the timing of said fourth time switch counter in response to the detection of the frame sync pattern.

17. A time division switching system comprising:
a clock source for generating slot timing pulses;
a path selection address memory for storing a path selection address and a path selection counter for sequentially reading the address out of said path selection address memory in response to said slot timing pulses;
a space switch for establishing a switched connection in accordance with the address read out of said path selection address memory;
a reference frame pulse generator for generating a reference frame timing pulse at constant frame intervals for resetting said path selection counter at constant frame intervals;
a variable phase frame pulse generator for generating a variable phase frame timing pulse;
a plurality of multiplexers connected through a common highway to said space switch for multiplexing data signals on input lines into time slots of said highway, each of said multiplexers including means for determining said time slots in accordance with the length of time from the occurrence of said frame timing pulse; and
a phase comparator for detecting a a time difference between said variable frame timing pulse and said reference frame timing pulse and controlling the timing of said variable phase frame.pulse generator according to said detected time difference so that data signals from said multiplexers arrive at said space switch in phase with the read timing of said path selection memory.

18. A time division switching system as claimed in claim 17, wherein said multipelxers are cascaded in said common highway.

19. A time division switching system as claimed in claim 17, wherein each of said multipelxers includes;
a gate circuit having a first input connected to the output of a preceding one of said multiplexers and a second input to which a data signal is supplied for normally passing signals on said first input to a succeeding one of said multiplexers; and
a counter for incrementing a binary count value in response to said slot timing pulse in response to said variable frame timing pulse; and
a digital comparator for detecting a match between said binary count value and a switching control word representing a desired time slot and causing said gate circuit to pass said data signal on said second input to said succeeding one of said multiplexers in response to the detection of said match.

20. A time division switching system comprising:
a clock source for generating slot timing pulses;
a path selection address memory for storing a path selection address and a path selection counter for sequentially reading the address out of said path selection address memory in response to said slot timing pulses;
a space switch for establishing a switched connection in accordance with the address read out of said path selection address memory;
a reference frame pulse generator for generating a reference frame timing pulse at constant frame intervals for resetting said path selection counter at constant frame intervals;
a variable phase frame sync pattern generator for generating a variable phase frame sync pattern;
a plurality of multiplexers connected through a common highway to said space switch for multiplexing said frame sync pattern and data signals on input lines into time slots of said highway, each of said multiplexers including means for detecting said multiplexed frame sync pattern and determining said time slots in accordance with the length of time from the detection of said frame sync pattern;
;means for detecting said multiplexed frame sync pattern; and
a phase comparator for detecting a a time difference between said detected frame sync pattern and said reference frame timing pulse and controlling the timing of said variable phase frame sync pattern generator according to said detected time difference so that data signals from said multiplexers arrive at said space switch in phase with the read timing of said path selection memory.

21. A time division switching system as claimed in claim 20, wherein said multipelxers are cascaded in said common highway.

22. A time division switching system as claimed in claim 20, wherein each of said multiplexers includes;
a gate circuit having a first input connected to the output of a preceding one of said multiplexers and a second input to which a data signal is supplied for normally passing signals on said first input to a succeeding one of said multiplexers;
a counter for incrementing a binary count value in response to said slot timing pulse in response to said variable frame timing pulse; and
a digital comparator for detecting a match between said binary count value and a switching control word representing a desired time slot and causing said gate circuit to pass said data signal on said second input to said succeeding one of said multiplexers in response to the detection of said match.

23. A time division switching system comprising:
a clock source for generating slot timing pulses;
a data memory having an array of cells corresponding to time slots of a signal on an inlet highway, said signal having a frame sync pattern and data signals inserted to said time slots at frame intervals;
a write counter driven by said slot timing pulses for sequentially writing said frame sync pattern and said data signals into said data memory cells;
a control memory for sequentially storing memory addresses of said data memory cells therein;
a first read counter driven by said slot timing pulses for reading memory addresses sequentially out of said control memory;
buffer storage means for storing memory addresses read out of said control memory;
a second read counter driven by said slot timing pulses for reading memory addresses out of the buffer storage means into said data memory and reading said frame sync pattern and said data signals out of said data memory cells into an outlet highway;
a frame pulse generator for resetting said first read counter at constant frame intervals; and
a frame synchronizer for detecting the frame sync pattern in said inlet highway and resetting said write counter and said second read counter in response to the detection of said frame sync pattern.

24. A time division switching system comprising:
a clock source for generating slot timing pulses;
a space switch having a plurality of crosspoints for establishing a switched connection between one or more inlet highways and one or more outlet highways, said one or more inlet highways carrying a frame sync pattern and data signals in time slots of a time division multiplexed input;
decoder means for selectively operating said crosspoints;
a control memory for storing data identifying the crosspoints of said space switch in sequence;
a first read counter driven by said slot timing pulses for reading data sequentially out of said control memory;
buffer storage means for storing data read out of said control memory;
a second read counter driven by said slot timing pulses for reading data out of the buffer storage means into said decoder means for operating said crosspoints;
a frame pulse generator for resetting said first read counter at constant frame intervals; and
means for resetting said second read counter in synchronism with the frame sync pattern in said inlet highway.

25. A time division switching system comprising:
a clock source for generating slot timing pulses;
a data memory having an array of cells corresponding to time slots of a signal on an inlet highway, said signal having a frame sync pattern and data signals contained in said time slots at frame intervals;

a write counter driven by said slot timing pulses for sequentially writing said frame sync pattern and said data signals into said data memory cells;

a control memory for storing a frame sync pattern and memory addresses of said data memory cells in sequence;

a read counter driven by said slot timing pulses for reading said frame sync pattern and memory addresses sequentially out of said control memory into said data memory for causing the frame sync pattern and data signals to be read out of said data memory cells onto an outlet highway;

a variable phase frame pulse generator for resetting said read counter at variable phase frame intervals;

a first frame synchronizer for detecting the frame sync pattern in said inlet highway and resetting said write counter in response to the detection of said frame sync pattern;

a second frame synchronizer for detecting the frame sync pattern read out of said control memory; and a phase comparator for detecting a time difference between the frame sync patterns detected by said first and second frame synchronizers and controlling said variable phase frame pulse generator in response to the said detected time difference.

26. A time division switching system comprising:
a clock source for generating slot timing pulses;
a space switch having a plurality of crosspoints for establishing a switched connection between one or more inlet highways and one or more outlet highways, said one or more inlet highways carrying a frame sync pattern and data signals in time slots of a time division multiplexed input;

decoder means for selectively operating said crosspoints;

a control memory for storing a frame sync pattern and data identifying the crosspoints of said space switch in sequence;

a read counter driven by said slot timing pulses for reading said frame sync pattern and data sequentially out of said control memory into said decoder means for operating said crosspoints;

a variable phase frame pulse generator for resetting said read counter at variable frame intervals;

means for generating a first frame timing pulse in synchronism with said sync pattern in said one or more inlet highways;

a frame synchronizer for detecting the frame sync pattern from signals supplied to said decoder means and generating a second frame timing pulse in response to the detection of the last-mentioned frame sync pattern; and a phase comparator for detecting a a time difference between said first and second frame timing pulses and controlling said variable phase frame pulse generator in response to the said detected time difference.

* * * * *